United States Patent
Vasseur et al.

(10) Patent No.: US 9,072,100 B2
(45) Date of Patent: Jun. 30, 2015

(54) SUB-SLOTTING TO IMPROVE PACKET SUCCESS RATE IN CARRIER SENSE MULTIPLE ACCESS NETWORKS

(75) Inventors: Jean-Philippe Vasseur, Saint Martin Duriage (FR); Jonathan W. Hui, Foster City, CA (US)

(73) Assignee: Cisco Technology, Inc., San Jose, CA (US)

( * ) Notice: Subject to any disclaimer, the term of this patent is extended or adjusted under 35 U.S.C. 154(b) by 1014 days.

(21) Appl. No.: 13/187,075

(22) Filed: Jul. 20, 2011

(65) Prior Publication Data

US 2013/0022083 A1     Jan. 24, 2013

(51) Int. Cl.
| | |
|---|---|
| *H04L 12/403* | (2006.01) |
| *H04W 74/08* | (2009.01) |
| *H04W 74/02* | (2009.01) |
| *H04L 12/413* | (2006.01) |
| *H04B 1/713* | (2011.01) |
| *H04W 48/16* | (2009.01) |

(52) U.S. Cl.
CPC .......... *H04W 74/0808* (2013.01); *H04W 74/02* (2013.01); *H04L 12/4035* (2013.01); *H04L 12/413* (2013.01); *H04B 1/713* (2013.01); *H04W 48/16* (2013.01)

(58) Field of Classification Search
CPC .......... H04L 1/0002; H04L 5/14; H04L 47/12; H04L 12/4035; H04L 12/413; H04W 28/22; H04W 47/0808; H04W 48/06; H04W 74/02; H04W 74/0808; H04B 1/713; H04Q 11/04; H04H 20/30
See application file for complete search history.

(56) References Cited

U.S. PATENT DOCUMENTS

| | | |
|---|---|---|
| 6,865,185 B1 | 3/2005 | Patel et al. |
| 6,961,323 B1 | 11/2005 | Xu et al. |
| 7,020,069 B1 | 3/2006 | Pollack et al. |
| 7,295,844 B1 | 11/2007 | Moon et al. |
| 7,444,145 B2 | 10/2008 | Diener |
| 7,453,840 B1 | 11/2008 | Dietrich et al. |
| 7,596,461 B2 | 9/2009 | Hart et al. |
| 7,801,096 B2 | 9/2010 | Myles et al. |
| 7,813,385 B1 | 10/2010 | Hyun et al. |
| 7,869,397 B2 | 1/2011 | Pollack et al. |
| 7,936,681 B2 | 5/2011 | Gong et al. |
| 7,978,725 B2 | 7/2011 | Gong et al. |

(Continued)

OTHER PUBLICATIONS

"RPL: IPv6 Routing Protocol for Low Power and Lossy Networks" <draft-ietf-roll-rpt-19> by Winter, at al. (Mar. 13, 2011 version).

*Primary Examiner* — Redentor Pasia
*Assistant Examiner* — Salvador E Rivas
(74) *Attorney, Agent, or Firm* — Parker Ibrahim & Berg LLC; James M. Behmke; Stephen D. LeBarron

(57) ABSTRACT

In one embodiment, a communication device in a frequency hopping communication network determines an intention to forward a first packet in a particular timeslot of a frequency hopping sequence. As such, the device scans in receive mode for an initial portion of the particular timeslot on a particular frequency known to neighbors of the communication device for reaching the communication device. In response to determining that the communication device is receiving a second packet during the initial portion, the device remains in receive mode to receive a remainder of the second packet. Conversely, in response to not receiving the second packet during the initial portion, the device proceeds to transmit the first packet during a remainder of the particular timeslot.

20 Claims, 11 Drawing Sheets

(56) References Cited

U.S. PATENT DOCUMENTS

2004/0259559 A1* 12/2004 Li et al. .................. 455/452.1
2008/0152061 A1* 6/2008 Kozat ........................ 375/358
2008/0279137 A1* 11/2008 Pernu et al. .................. 370/328
2011/0122922 A1* 5/2011 Eriksson Lowenmark et al. ........................... 375/135

* cited by examiner

US 9,072,100 B2

SUB-SLOTTING TO IMPROVE PACKET SUCCESS RATE IN CARRIER SENSE MULTIPLE ACCESS NETWORKS

TECHNICAL FIELD

The present disclosure relates generally to communication networks, and, more particularly, to carrier sense multiple access (CSMA) frequency hopping networks.

BACKGROUND

In a frequency hopping (or channel hopping) mesh network, devices communicate using different frequencies/channels at different times. To communicate a packet, a transmitter-receiver pair must be configured to the same channel during packet transmission. For a transmitter to communicate with a receiver at an arbitrary time in the future, the transmitter and receiver must synchronize to a channel schedule that specifies to what channel to communicate on at what time. That is, to communicate a message, the transmitter must transmit the message according to the receiver's frequency hopping schedule. Note that the transmitter will often need to transmit the message on a channel different from its own receiving schedule.

Many communication devices, particularly in low-power and lossy network (LLNs), typically communicate using only a single transceiver due to cost or energy constraints. Most narrow band transceivers in use today can only be configured to transmit or receive on a single channel at a time. That is, while configured for a particular channel, the transceiver cannot transmit or receive on any other channel, and since transceivers are typically half-duplex, they do not have the ability to transmit and receive at the same time.

Because a narrow-band transceiver is limited to a single channel and is half-duplex, determining the cause of a packet drop effectively in a carrier sense multiple access (CSMA)-based network can be challenging. In particular, when a device "A" fails to receive an acknowledgment from a device "B," it does not know if the transmission was lost due to link quality issues or simply because device B was tuned to a different channel and/or transmitting at the same time. Also, though CSMA-based systems typically employ random backoffs and clear-channel assessment mechanism to help avoid collisions, in a frequency hopping system, the traditional clear-channel assessment mechanism no longer applies.

BRIEF DESCRIPTION OF THE DRAWINGS

The embodiments herein may be better understood by referring to the following description in conjunction with the accompanying drawings in which like reference numerals indicate identically or functionally similar elements, of which.

DESCRIPTION OF EXAMPLE EMBODIMENTS

Overview

Figure 1:
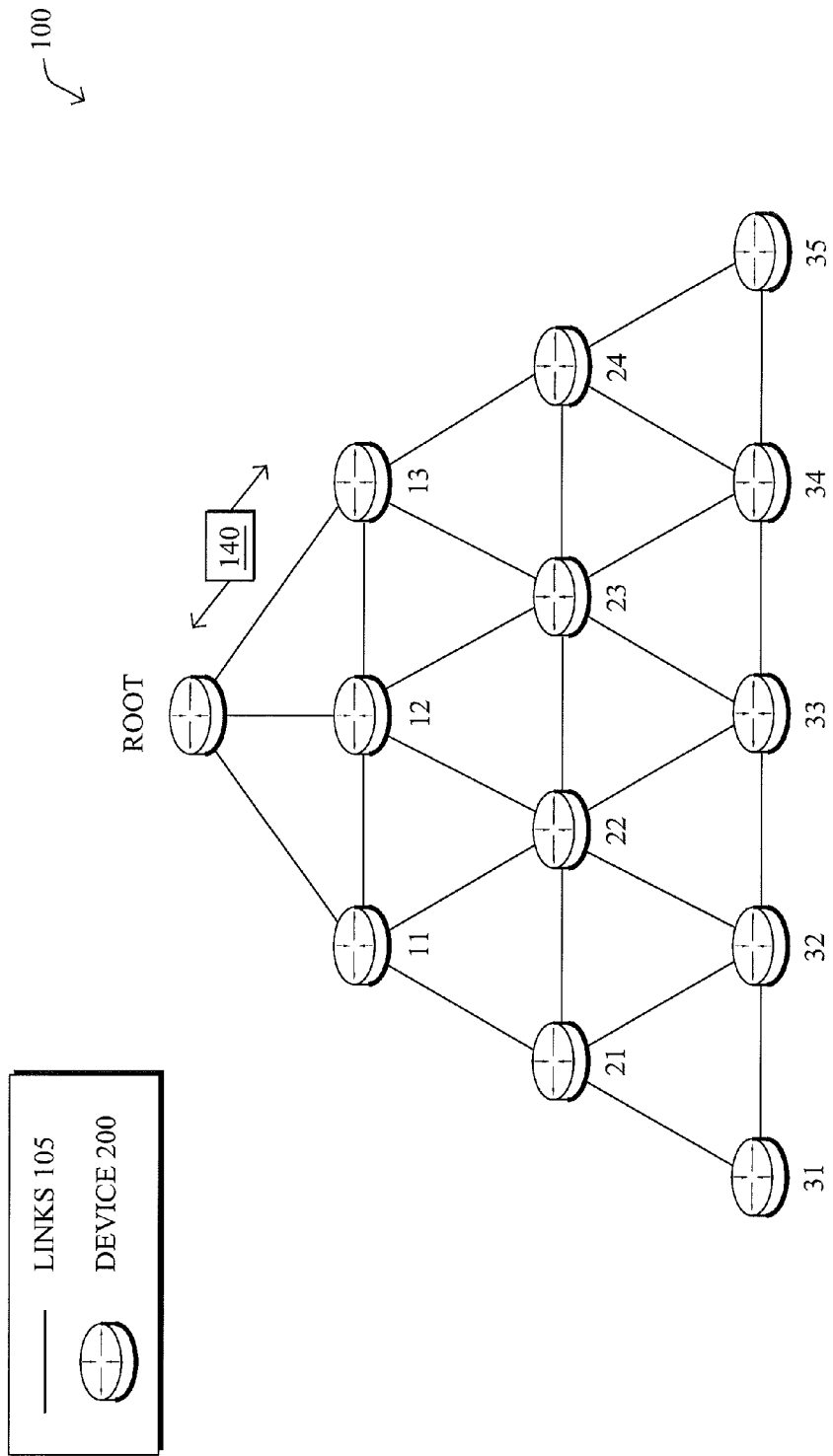
FIG. 1 illustrates an example shared-media communication network.

According to one or more embodiments of the disclosure, a communication device in a frequency hopping communication network determines an intention to forward a first packet in a particular timeslot of a frequency hopping sequence. As such, the device scans in receive mode for an initial portion of the particular timeslot on a particular frequency known to neighbors of the communication device for reaching the communication device. In response to determining that the communication device is receiving a second packet during the initial portion, the device remains in receive mode to receive a remainder of the second packet. Conversely, in response to not receiving the second packet during the initial portion, the device proceeds to transmit the first packet during a remainder of the particular timeslot.

Description

A computer network is a geographically distributed collection of nodes interconnected by communication links and segments for transporting data between end nodes, such as personal computers and workstations, or other devices, such as sensors, etc. Many types of networks are available, with the types ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), synchronous digital hierarchy (SDH) links, or Powerline Communications (PLC) such as IEEE 61334, IEEE P1901.2, and others.

A wireless network, in particular, is a type of shared media network where a plurality of nodes communicate over a wireless medium, such as using radio frequency (RF) transmission through the air. For example, a Mobile Ad-Hoc Network (MANET) is a kind of wireless ad-hoc network, which is generally considered a self-configuring network of mobile routes (and associated hosts) connected by wireless links, the union of which forms an arbitrary topology. For instance, Low power and Lossy Networks (LLNs), e.g., certain sensor networks, may be used in a myriad of applications such as for "Smart Grid" and "Smart Cities" (e.g., for Advanced Metering Infrastructure or "AMI" applications) and may often consist of wireless nodes in communication within a field area network (FAN). LLNs are generally considered a class of network in which both the routers and their interconnect are constrained: LLN routers typically operate with constraints, e.g., processing power, memory, and/or energy (battery), and their interconnects are characterized by, illustratively, high loss rates, low data rates, and/or instability. LLNs are comprised of anything from a few dozen and up to thousands or even millions of LLN routers, and support point-to-point traffic (between devices inside the LLN), point-to-multipoint traffic (from a central control point to a subset of devices inside the LLN) and multipoint-to-point traffic (from devices inside the LLN towards a central control point).

FIG. 1 is a schematic block diagram of an example computer network 100 (e.g., wireless or otherwise) illustratively comprising nodes/devices 200 (e.g., labeled as shown, "root," "11," "12," . . . "35"), which are interconnected by frequency-hopping communication links 105, as described below. In particular, certain nodes 200, such as, e.g., routers, sensors, computers, radios, etc., may be in communication with other nodes 200, e.g., based on distance, signal strength, current operational status, location, etc. Those skilled in the art will understand that any number of nodes, devices, links, etc. may be used in the wireless network, and that the view shown herein is for simplicity (particularly, that while routers are shown, any wireless communication devices may be utilized). Also, while the embodiments are illustratively shown herein with reference to a generally wireless network, the description herein is not so limited, and may be applied to networks that have wired links, wireless links, PLC links, etc.

Data transmissions 140 (e.g., traffic, packets, messages, etc. sent between the devices/nodes) may be exchanged among the nodes/devices of the computer network 100 using predefined network communication protocols such as certain known wireless protocols (e.g., IEEE Std. 802.15.4, WiFi, Bluetooth®, etc.) or other shared media protocols where appropriate (e.g., PLC). As described herein, the communication may be based on a frequency-hopping protocol. In this context, a protocol consists of a set of rules defining how the nodes interact with each other.

Figure 2:
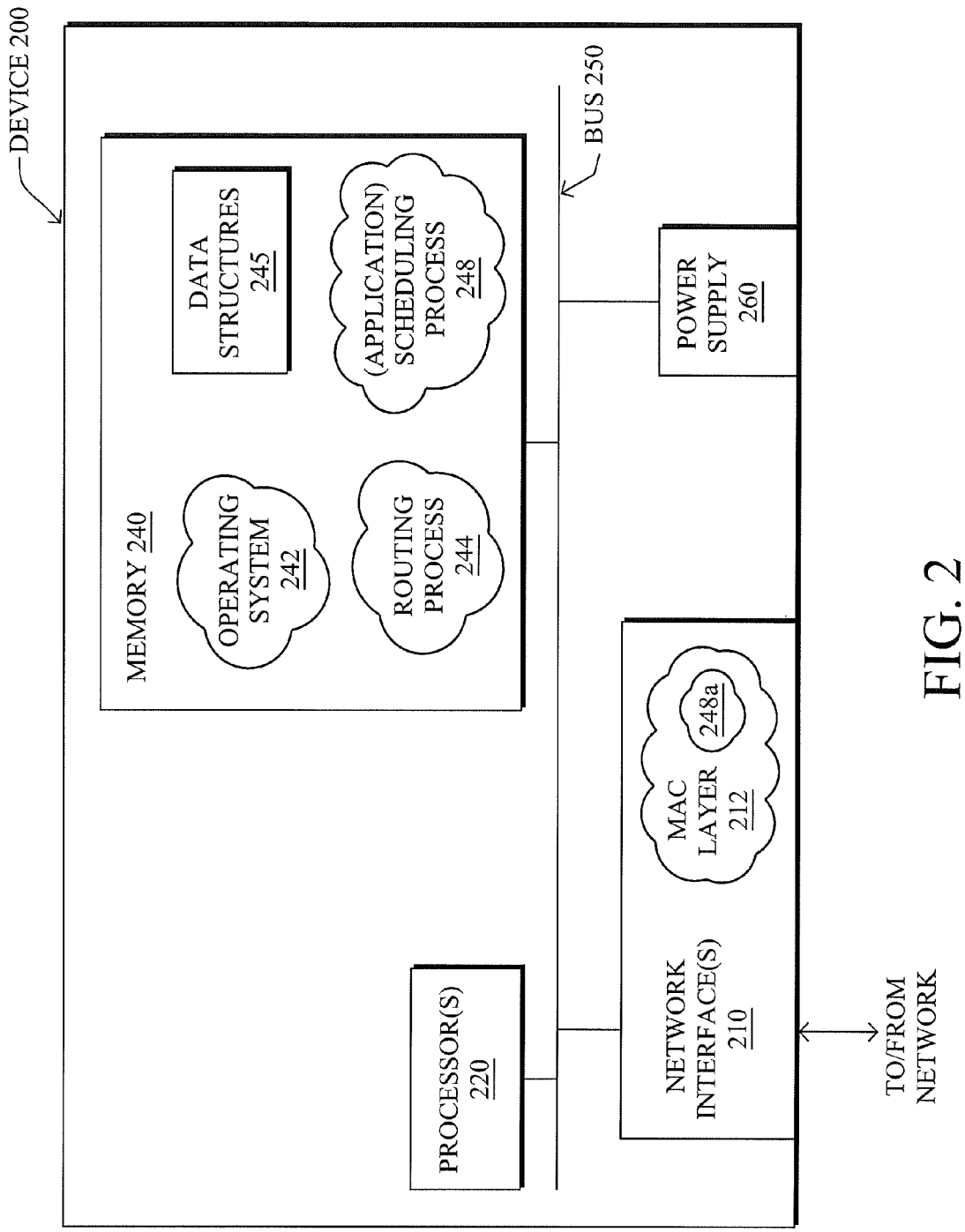
FIG. 2 illustrates an example device/node.

FIG. 2 is a schematic block diagram of an example node/device 200 that may be used with one or more embodiments described herein, e.g., as any of the nodes in FIG. 1 above. The device may comprise one or more network interfaces 210 (e.g., wireless/frequency-hopping), at least one processor 220, and a memory 240 interconnected by a system bus 250, as well as a power supply 260 (e.g., plug-in, battery, etc.).

The network interface(s) 210, e.g., transceivers, contain the mechanical, electrical, and signaling circuitry for communicating data over wireless links 105 coupled to the network 100. The network interfaces may be configured to transmit and/or receive data using a variety of different communication protocols as noted above and as will be understood by those skilled in the art, particularly for frequency-hopping communication as described herein. In addition, the interfaces 210 may comprise an illustrative media access control (MAC) layer module 212 (and other layers, such as the physical or "PHY" layer, as will be understood by those skilled in the art). Note, further, that the nodes may have two different types of network connections 210, namely, wireless and wired/physical connections, and that the view herein is merely for illustration.

The memory 240 comprises a plurality of storage locations that are addressable by the processor 220 and the network interfaces 210 for storing software programs and data structures associated with the embodiments described herein. Note that certain devices may have limited memory or no memory (e.g., no memory for storage other than for programs/processes operating on the device). The processor 220 may comprise necessary elements or logic adapted to execute the software programs and manipulate the data structures 245. An operating system 242, portions of which are typically resident in memory 240 and executed by the processor, functionally organizes the device by, inter alia, invoking operations in support of software processes and/or services executing on the device. These software processes and/or services may comprise routing process/services 244, and an illustrative "scheduling" process 248 as described in greater detail below. Note that while scheduling process 248 is shown in centralized memory 240, alternative embodiments provide for the mode selection process to be specifically operated within the network interfaces 210, such as a component of MAC layer 212 (process "248a").

It will be apparent to those skilled in the art that other processor and memory types, including various computer-readable media, may be used to store and execute program instructions pertaining to the techniques described herein. Also, while the description illustrates various processes, it is expressly contemplated that various processes may be embodied as modules configured to operate in accordance with the techniques herein (e.g., according to the functionality of a similar process). Further, while the processes have been shown separately, those skilled in the art will appreciate that processes may be routines or modules within other processes.

Routing process (services) 244 contains computer executable instructions executed by the processor 220 to perform functions provided by one or more routing protocols, such as proactive or reactive routing protocols as will be understood by those skilled in the art. These functions may, on capable devices, be configured to manage a routing/forwarding table (e.g., a data structure 245) containing, e.g., data used to make routing/forwarding decisions. In particular, in proactive routing, connectivity is discovered and known prior to computing routes to any destination in the network, e.g., link state routing such as Open Shortest Path First (OSPF), or Intermediate-System-to-Intermediate-System (ISIS), or Optimized Link State Routing (OLSR). Reactive routing, on the other hand, discovers neighbors (i.e., does not have an a priori knowledge of network topology), and in response to a needed route to a destination, sends a route request into the network to determine which neighboring node may be used to reach the desired destination. Example reactive routing protocols may comprise Ad-hoc On-demand Distance Vector (AODV), Dynamic Source Routing (DSR), DYnamic MANET On-demand Routing (DYMO), etc. Notably, on devices not capable or configured to store routing entries, routing process 244 may consist solely of providing mechanisms necessary for source routing techniques. That is, for source routing, other devices in the network can tell the less capable devices exactly where to send the packets, and the less capable devices simply forward the packets as directed.

Notably, mesh networks have become increasingly popular and practical in recent years. In particular, shared-media mesh networks, such as wireless or PLC networks, etc., are often on what is referred to as Low-Power and Lossy Networks (LLNs), which are a class of network in which both the routers and their interconnect are constrained: LLN routers typically operate with constraints, e.g., processing power, memory, and/or energy (battery), and their interconnects are characterized by, illustratively, high loss rates, low data rates, and/or instability. LLNs are comprised of anything from a few dozen and up to thousands or even millions of LLN routers, and support point-to-point traffic (between devices inside the LLN), point-to-multipoint traffic (from a central control point such at the root node to a subset of devices inside the LLN) and multipoint-to-point traffic (from devices inside the LLN towards a central control point).

An example protocol specified in an Internet Engineering Task Force (IETF) Internet Draft, entitled "RPL: IPv6 Routing Protocol for Low Power and Lossy Networks" <draft-ietf-roll-rpl-19> by Winter, at al. (Mar. 13, 2011 version), provides a mechanism that supports multipoint-to-point (MP2P) traffic from devices inside the LLN towards a central control point (e.g., LLN Border Routers (LBRs) or "root nodes/devices" generally), as well as point-to-multipoint (P2MP) traffic from the central control point to the devices inside the LLN (and also point-to-point, or "P2P" traffic). RPL (pronounced "ripple") may generally be described as a distance vector routing protocol that builds a Directed Acyclic Graph (DAG) for use in routing traffic/packets 140, in addition to defining a set of features to bound the control traffic, support repair, etc. Notably, as may be appreciated by those skilled in the art, RPL also supports the concept of Multi-Topology-Routing (MTR), whereby multiple DAGs can be built to carry traffic according to individual requirements.

Frequency-hopping, also referred to as "frequency-hopping spread spectrum" (FHSS) or channel-hopping, is a method of transmitting radio signals by rapidly switching a carrier among numerous frequency channels, e.g., using a pseudorandom sequence known to both transmitter and receiver. For example, frequency-hopping may be utilized as a multiple access method in the frequency-hopping code division multiple access (FH-CDMA) scheme. Generally, as may be appreciated by those skilled in the art, transmission using frequency-hopping is different from a fixed-frequency transmission in that frequency-hopped transmissions are resistant to interference and are difficult to intercept. Accordingly, frequency-hopping transmission is a useful technique for many applications, such as sensor networks, LLNs, military applications, etc.

Figure 3:
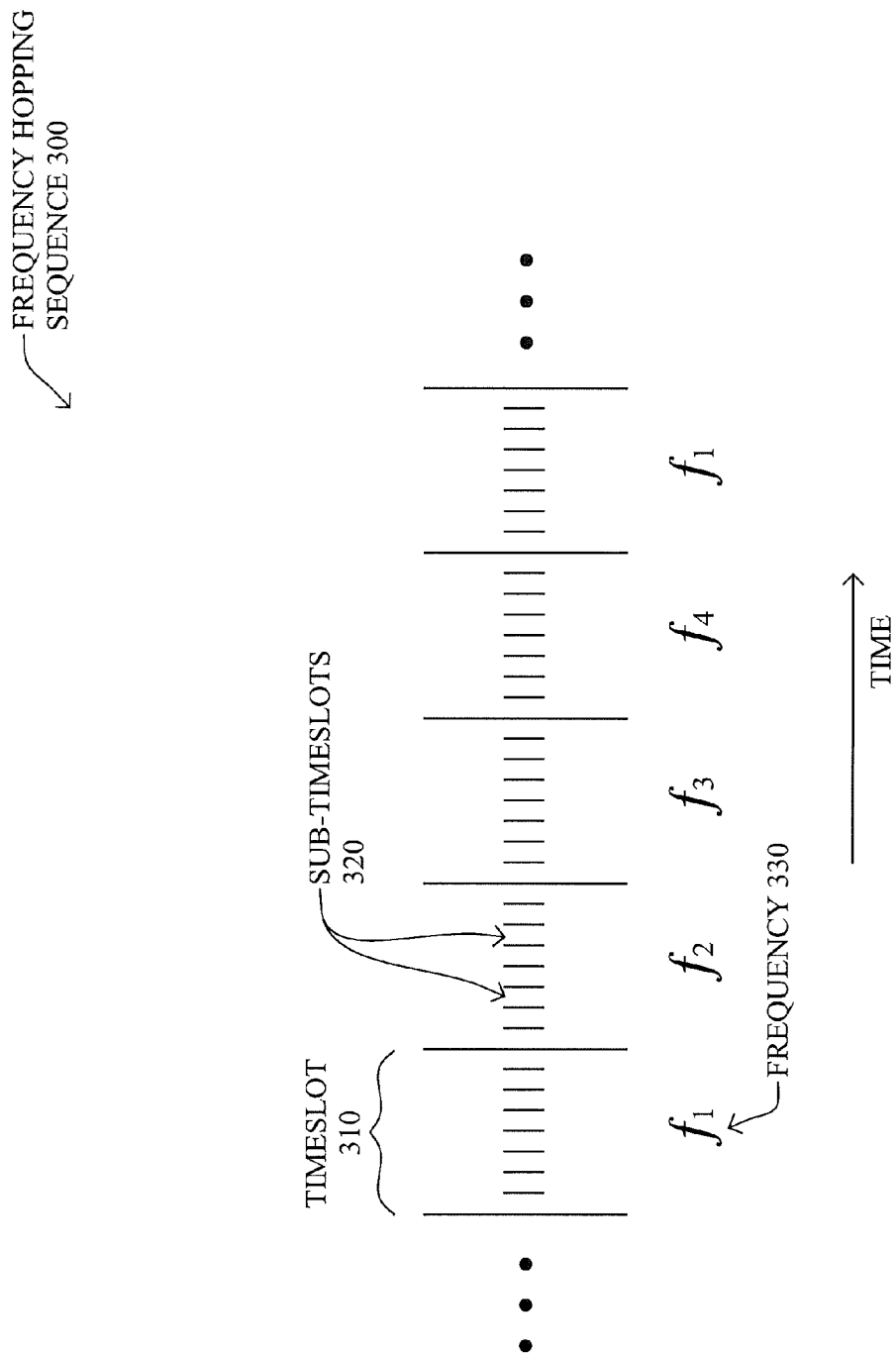
FIG. 3 illustrates an example frequency hopping sequence.

In general, as shown in FIG. 3, in frequency-hopping wireless networks, time frames are divided within a frequency-hopping sequence 300 into regular timeslots 310, each one operating on a different frequency 330 (e.g., $f_1$-$f_4$). A reference clock may be provided for the time frames for an entire network (e.g., mesh/cell), or at least between pairs of communicating devices. A MAC layer 212 of each node 200 divides time into timeslots that are aligned with the timeslot boundary of its neighbor. Also, each timeslot 310 may be further divided into sub-timeslots 320. (Note that not all frequency-hopping systems use sub-timeslots, and devices can begin transmission at any time within a timeslot; the view herein is merely one example.) Illustratively, the MAC layer 212 is in charge of scheduling the timeslot in which a packet is sent, one objective of which generally being scheduling of the transmission time in order to avoid collisions with neighbors' packets. Note that the MAC layer 212 must not only schedule the data messages coming from upper layers of a protocol stack, but it also must schedule its own packets (e.g., acknowledgements, requests, beacons, etc.).

Carrier sense multiple access (CSMA) is a probabilistic MAC protocol in which a node verifies the absence of other traffic before transmitting in a shared-media communication network. Carrier sensing, in particular, directs a network interface to detect whether a carrier wave (the presence of another transmission from another device) is present on the shared-media network before trying to transmit. If a carrier is sensed, the device waits for the transmission in progress to finish before initiating its own transmission.

Figure 4A:
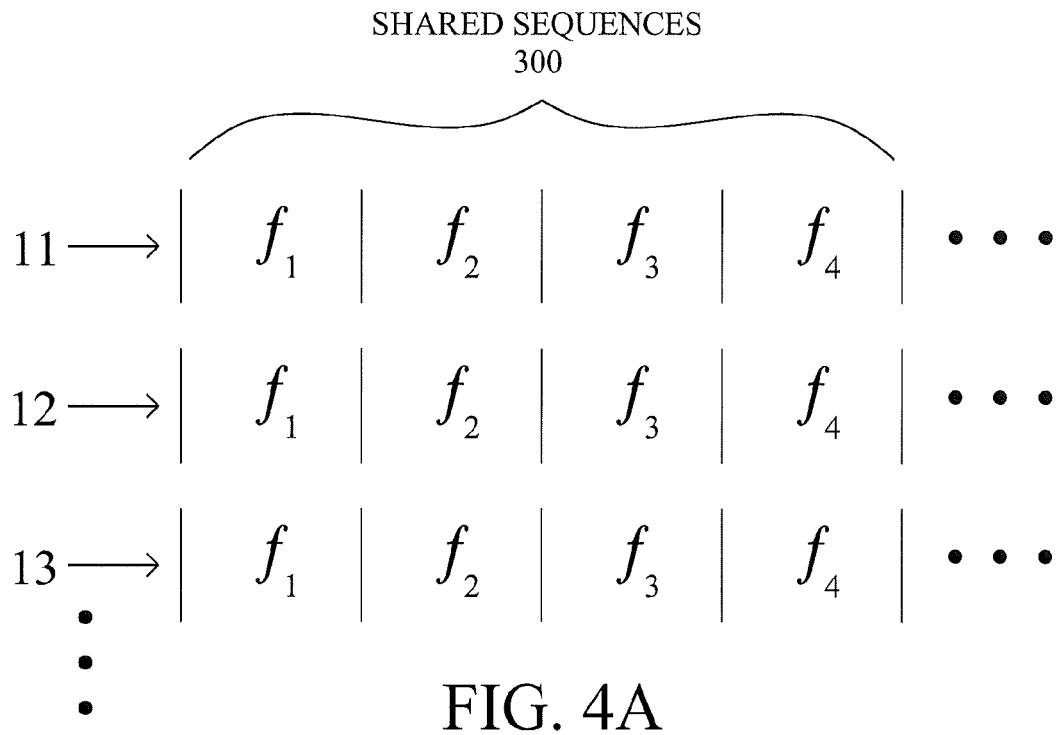
FIGS. 4A-4C illustrate another example of frequency hopping sequences.

A device in the frequency-hopping network configures its receiver to follow a hopping schedule by picking a channel sequence, duration of each time slot, and time base that defines when the first slot in the schedule begins. To then communicate a packet, the transmitter and receiver must be configured to the same channel during the packet transmission. All devices in a given network may utilize the same hopping schedule (i.e. all devices are configured to use the same channel sequence, time slot duration, and a common time base), resulting in a network where all communication in the network at any given point in time utilizes the same channel. An example of this is shown in FIG. 4A, in which each receiver (e.g., shown for nodes 11, 12, and 33) are all configured with the same sequence (assume also that the other nodes of the network 100 use the same sequence).

Figure 4B:
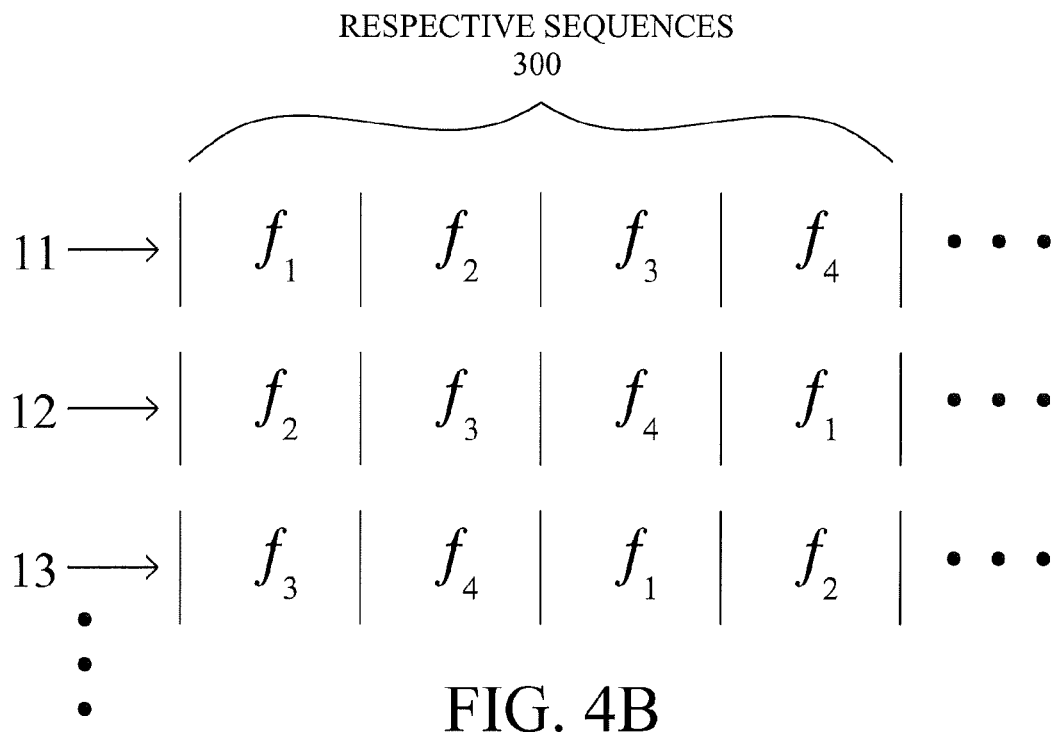

Alternatively, each transmitter-receiver pair may utilize different hopping schedules (i.e., each pair may differ in channel sequence, time slot duration, and/or time base), such that transmitter-receiver pairs may communicate at the same time but on different channels. For instance, each device in the channel hopping network may individually pick their own hopping schedule parameters independent of any other node, as is shown in FIG. 4B. Having each receiver maintain its own channel-hopping schedule increases overall throughput of the network since different transmitter-receiver pairs can use multiple channels simultaneously. Requiring each transmitter to synchronize with each receiver independently increases overall robustness, since any synchronization errors will be localized to the affected transmitter-receiver pair.

Figure 4C:
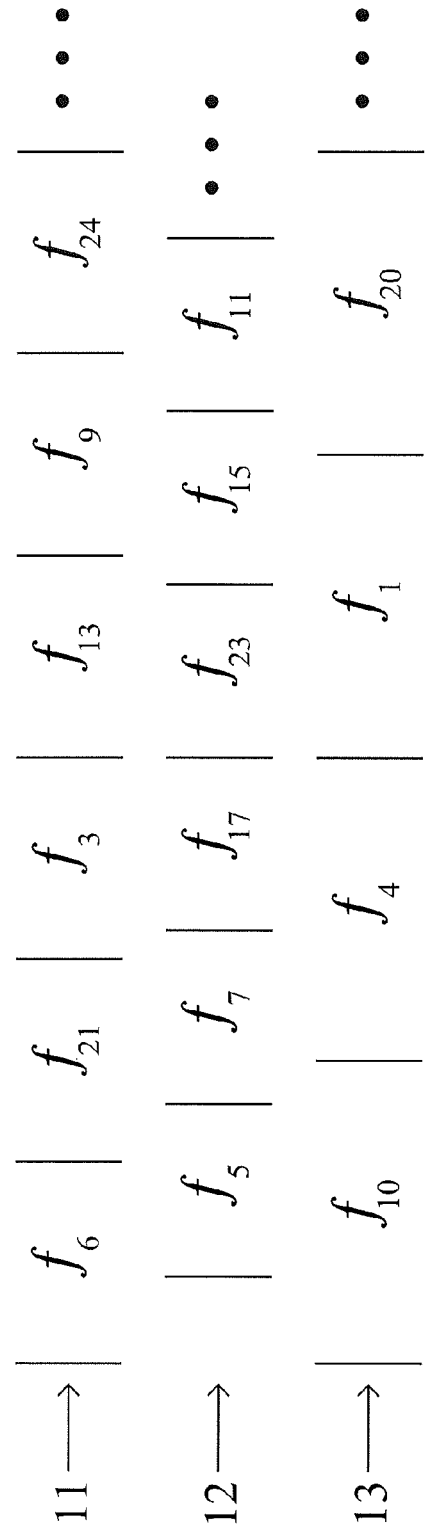

Note that the offset of the frequencies in FIG. 4B (i.e., the fact that the same four frequencies are used in the same order, just offset by one timeslot) is merely one illustration, and the sequences and frequencies can be independently chosen. Also, note that while timeslots are shown as being synchronized between different nodes, those skilled in the art will appreciate that timeslots between different nodes can, in fact, be out-of-phase, and may have no relationship with each other. For example, FIG. 4C illustrates another example of independently determined listening schedules 300 that may be computed by each individual device in the network 100 (again, only nodes 11, 12, and 13 are shown for brevity). Note how there is generally no overlap at any given time (a goal of a typical scheduling algorithm, but not a necessity), and that certain frequencies may be re-used at different times. Note also that contrary to FIG. 4B, the schedules are completely independent, that is, they are not simply an offset of the same order, and the slots do not generally line up between the devices.

A device synchronizes its hopping schedule with another device by communicating its channel sequence, time slot duration, and current time within the hopping schedule. Hopping schedule parameters may be communicated in explicit synchronization packets and/or piggybacked on existing data packets. As mentioned, some of these parameters (e.g., channel sequence) may be network-wide and implicit. Devices store these parameters to know what channel to use for transmission at a particular time.

As noted above, many communication devices, particularly in LLNs, typically communicate using only a single transceiver due to cost or energy constraints, which generally can only be configured to transmit or receive on a single channel at a time. Because a narrow-band transceiver is limited to a single channel and is half-duplex, determining packet loss reasons (and metrics, such as "ETX," an expected transmission count to reach a destination) effectively in a CSMA-based network can be challenging. In particular, when a device, e.g., node 31, fails to receive an acknowledgment from another device, e.g., node 21, it does not know if the transmission was lost due to link quality issues or simply because node 21 was tuned to a different channel and/or transmitting at the same time. Note that these challenges do not exist in time division multiple access (TDMA)-based networks because in TDMA networks transmissions are scheduled across all transmitter-receiver pairs in the network in a way that guarantees no such collisions will occur. However, compared to CSMA-based systems, TDMA-based systems incur additional overhead for synchronization and scheduling and are less flexible to changing conditions.

CSMA-based systems typically employ random backoffs and clear-channel assessment mechanism to help avoid collisions. However, in a channel-hopping system, the traditional clear-channel assessment mechanism no longer applies. In particular, consider a simplified portion of network 100 comprising nodes 31→21→11, where node 31 is forwarding packets to node 21 and node 21 is forwarding packets to node 11. Because a CSMA-based network allows devices to begin transmission at any time, both node 31 and node 21 may choose to begin forwarding packets simultaneously. In a single-channel network, node 31 can utilize clear-channel assessment techniques to detect whether or not node 21 is already attempting to forward a packet to node 11. However, in a channel-hopping network, node 31 and node 21 may be transmitting on different channels. Furthermore, because the channel-hopping sequence is local to each transmitter receiver pair (i.e., the channel-hopping sequence for sending packets to node 21 is different than for sending packets to node 11), node 31 does not know what channel node 21 is transmitting on. As a result, the clear-channel assessment is no longer useful to detect whether or not node 21 is currently transmitting a message. Furthermore, node 31 may not hear the packet sent by node 21 to 11, even if they were using the same channel.

This challenge is compounded by the fact that when node 31 transmits a message to node 21 and receives no acknowledgment, node 31 does not know the cause of the packet drop. In particular, node 31 does not know if there was simply a transmission failure (e.g., due to external interference or temporary fading) in the data or acknowledgment packet or if node 21 was simply busy transmitting on a different channel.

Certain existing systems synchronize the entire network to the same channel-switching schedule, where all nodes to receive on the same channel at the same time, and the entire network hops together in lock-step. While this first system is optimized for broadcast, it does not allow frequency diversity for unicast where different pairs of nodes may communicate at the same time on different channels. In a second example system, both unicast and broadcast slots may be utilized, where a central gateway device computes the hopping schedule for each transmitter-receiver pair, and the schedules are distributed using the wireless network. Because communication in this second system is explicitly scheduled (e.g., TDMA-based systems), an intended receiver of a transmitted message will never be busy transmitting at the same time as the message is being transmitted. However, compared to CSMA-based systems, this scheduled system incurs additional synchronization and scheduling overhead, and is less flexible to changing conditions.

Sub-Slotting

The techniques described herein reduce packet drops and/or collisions in a CSMA frequency-hopping network generally due to the intended receiver being busy transmitting, e.g., on a different channel. In particular, as described herein, begin a timeslot with a dynamically adjusted "fast scan" listening sub-slot to determine if there is a packet to receive before transmitting and/or forwarding messages during the rest of the timeslot (an "active" sub-slot).

Specifically, according to one or more embodiments of the disclosure as described in greater detail below, a communication device in a frequency hopping communication network determines an intention to forward a first packet in a particular timeslot of a frequency hopping sequence. As such, the device scans in receive mode for an initial portion of the particular timeslot on a particular frequency known to neighbors of the communication device for reaching the communication device. In response to determining that the communication device is receiving a second packet during the initial to portion, the device remains in receive mode to receive a remainder of the second packet. Conversely, in response to not receiving the second packet during the initial portion, the device proceeds to transmit the first packet during a remainder of the particular timeslot.

Illustratively, the techniques described herein may be performed by hardware, software, and/or firmware, such as in accordance with scheduling process 248 and/or MAC layer module 212 (248a), which may each contain computer executable instructions executed by a processor (e.g., processor 220 or an independent processor within the network interface 210) to perform functions relating to the novel techniques described herein, such as, e.g., as part of a frequency hopping communication protocol. For example, the techniques herein may be treated as extensions to conventional wireless communication protocols, such as the IEEE 802.11 protocol, IEEE 802.15.4, WiFi, etc., and as such, would be processed by similar components understood in the art that execute such protocols, accordingly.

Figure 5:
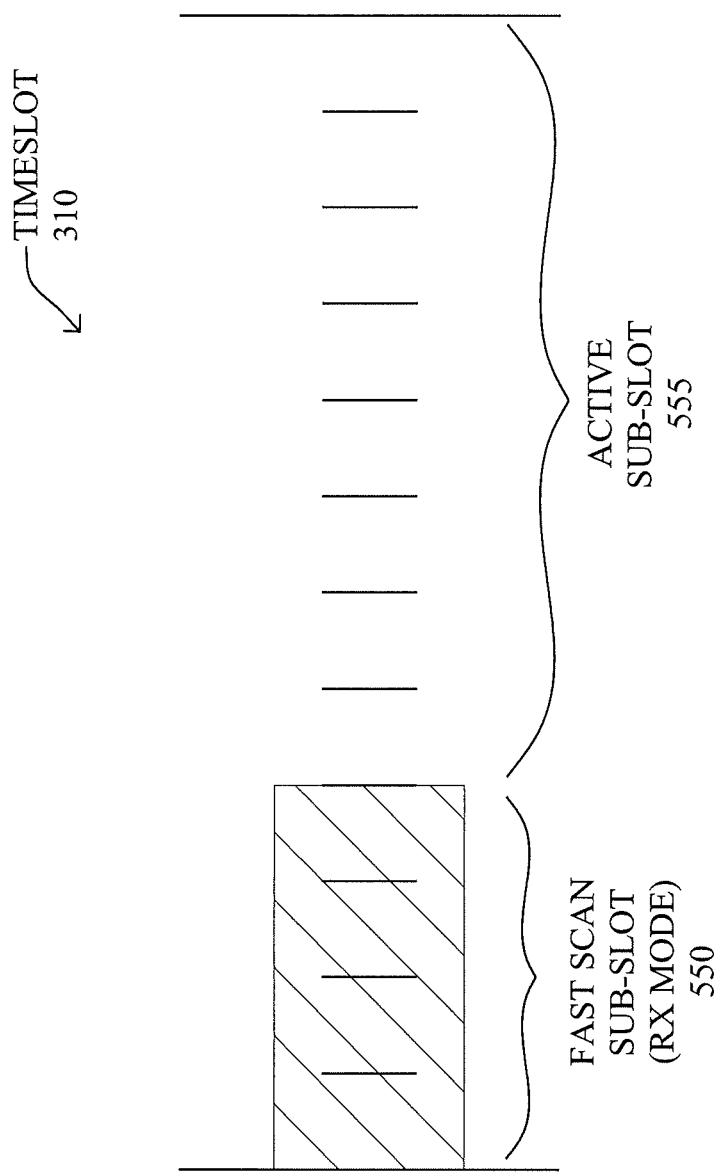
FIG. 5 illustrates an example sub-slotted timeslot.

Operationally, the techniques herein consist of splitting each timeslot 310 in two sub-slots referred to as a "fast scan" period or portion and an "active" period or portion. FIG. 5 illustrates an example sub-slotted timeslot 310, comprising a fast scan sub-slot 550 during which a device remains in receive mode as described herein, and an active sub-slot 555 during which the device may transmit. For example, as shown in FIG. 5, of 12 sub-timeslots 320, four are used for the fast scan sub-slot 550, and the remaining eight sub-timeslots are used for the active sub-slot 555. Alternatively, assuming an example of timeslots of 125 ms, each timeslot may starts with a fast scan period 550 of e.g., 25 ms. (Note that these values are all merely examples, and are not meant to limit the scope of the embodiments herein.)

According to the techniques herein, if a node/device has to forward a packet, e.g., transmitting a generated packet 140 or forwarding a received packet from another device, thus determining an intention to forward a packet in a particular timeslot, it does not immediately switch its frequency to its next-hop's frequency (assuming independent frequencies as noted above in FIGS. 4B and 4C) and start transmitting the desired packet. In particular, during the fast scan sub-slot 550 the device first listens using the frequency that it has provided to its neighbor in it unicast schedule (i.e., on a particular frequency known to neighbors of the communication device for reaching the communication device), therefore scanning in a receive mode for an initial portion of the particular timeslot to determine whether the communication device is receiving another packet during the initial portion.

Figure 6A:
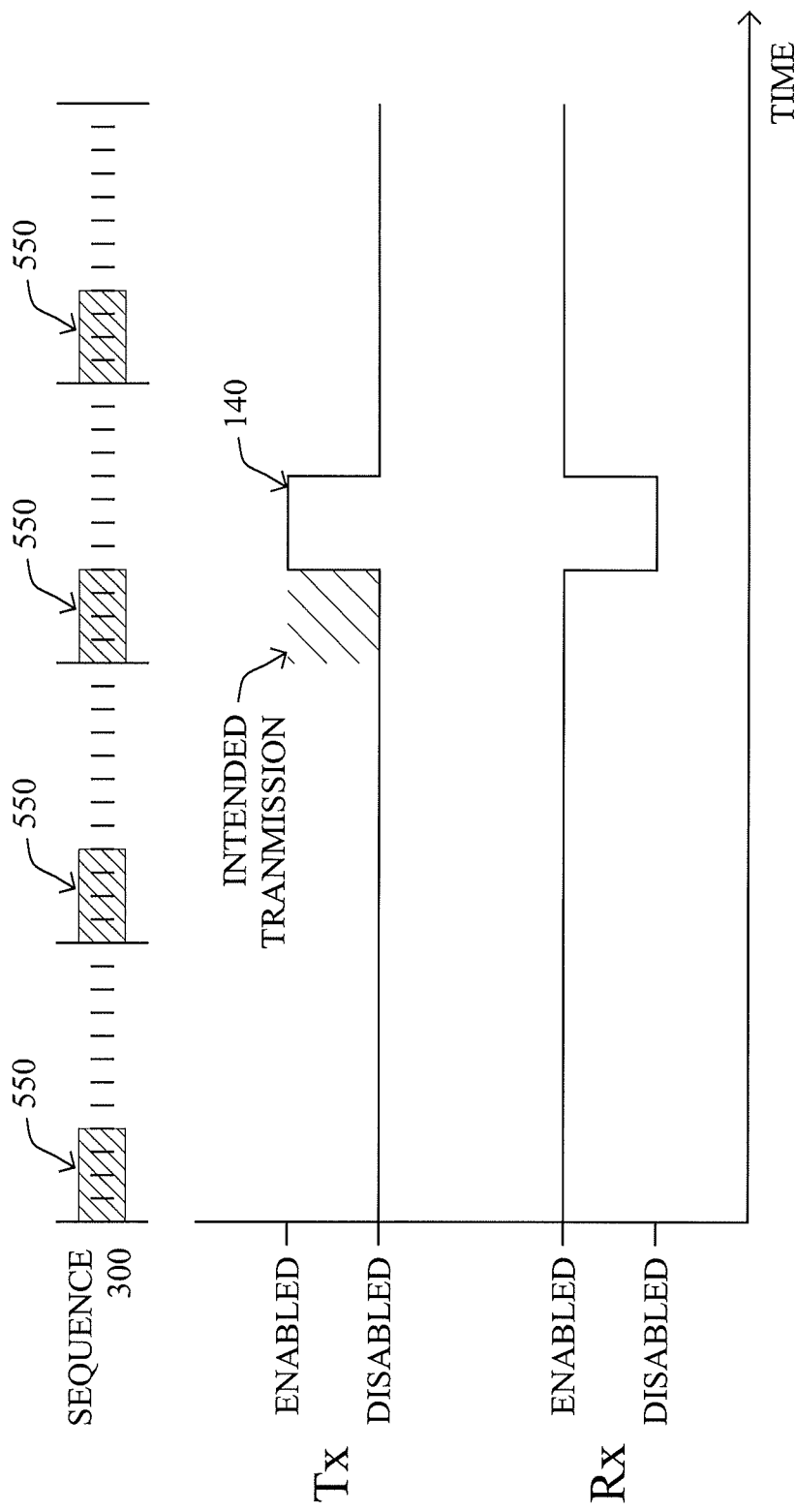
FIGS. 6A-6B illustrate examples of sub-slotting operation.

FIG. 6A illustrates an example of sub-slotting operation according to one or more embodiments herein. In particular, assuming the illustrative sequence 300 and corresponding fast scan sub-slots 550, the communication device may enable a receive mode until an intended transmission. At the time of the intended transmission, assuming it would overlap a fast scan sub-slot 550, the communication device waits for the fast scan sub-slot to complete before attempting to transmit the desired packet 140. In other words, a transmission cannot start during the fast scan sub-slot 550 (unless it is a critical transmission in certain so-configured embodiments).

Figure 6B:
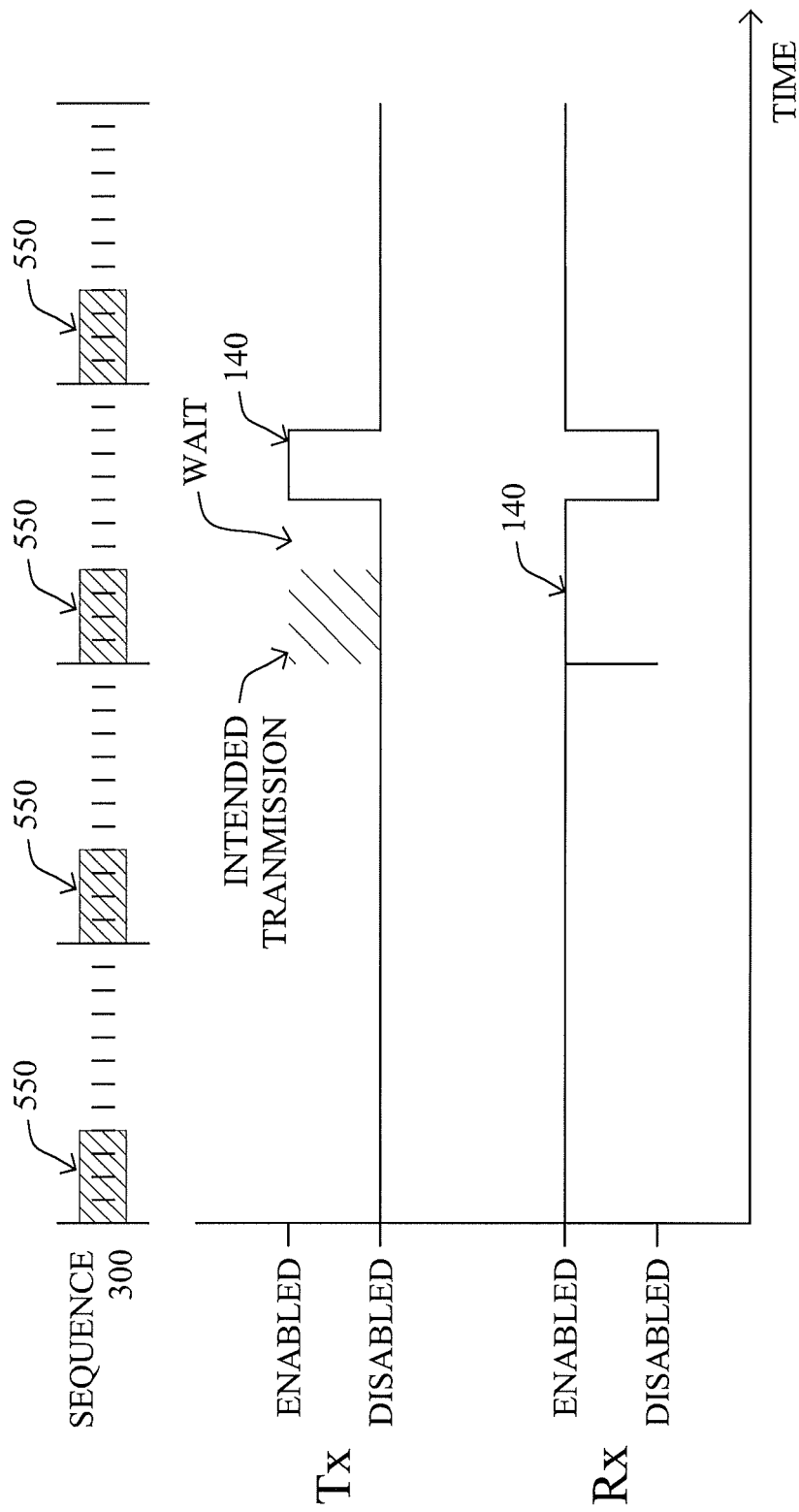

If no traffic has been received after the expiration of the fast scan period 550, the node may (if need be) adjusts its frequency to its next-hop frequency and starts sending the desired packet. Said differently, in response to not receiving another packet during the initial portion of the timeslot reserved for receiving packets (sub-slot 550), the communication device may then transmit the intended packet during a remainder of the particular timeslot (sub-slot 555). In response to receiving another packet during the initial portion (fast scan sub-slot 550), however, as shown in FIG. 6B, the communication device remains in a receive mode to receive a remainder of the other packet, accordingly, prior to transmitting the desired packet itself.

Suppose, for example, that node 21 has received a packet from node 31, and is about to forward it to node 11. With the mechanisms described above, node 21 would first set its listening frequency to its unicast schedule to determine whether another node (e.g., node 31 again, or else any other node within listening distance) is about to send a packet to node 21. If indeed another node is sending a packet to node 21, then according to the techniques herein, that packet will (generally) be successfully received by node 21, rather than being dropped due to unknown transmissions by node 21. On the other hand, of course, if no packet is being received by node 21 during the fast scan period 550, then an additional delay of the fast scan length (e.g., milliseconds) will be experienced by the packet instead of immediately being transmitted to node 11.

In one or more embodiments herein, the fast scan period may be dynamically adjusted according to various factors, such as the packet direction and node position in the routing topology (e.g., the rank value in a DODAG in the example of RPL). For example, the length may be adjusted depending on hop-distance from the communication device to a root node of a DAG, e.g., where the length is longer for devices closer to the root node than for other devices further from the root node in order to accommodate the "fan-in" effect of a typical multi-point-to-point (MP2P) network.

Figure 7:
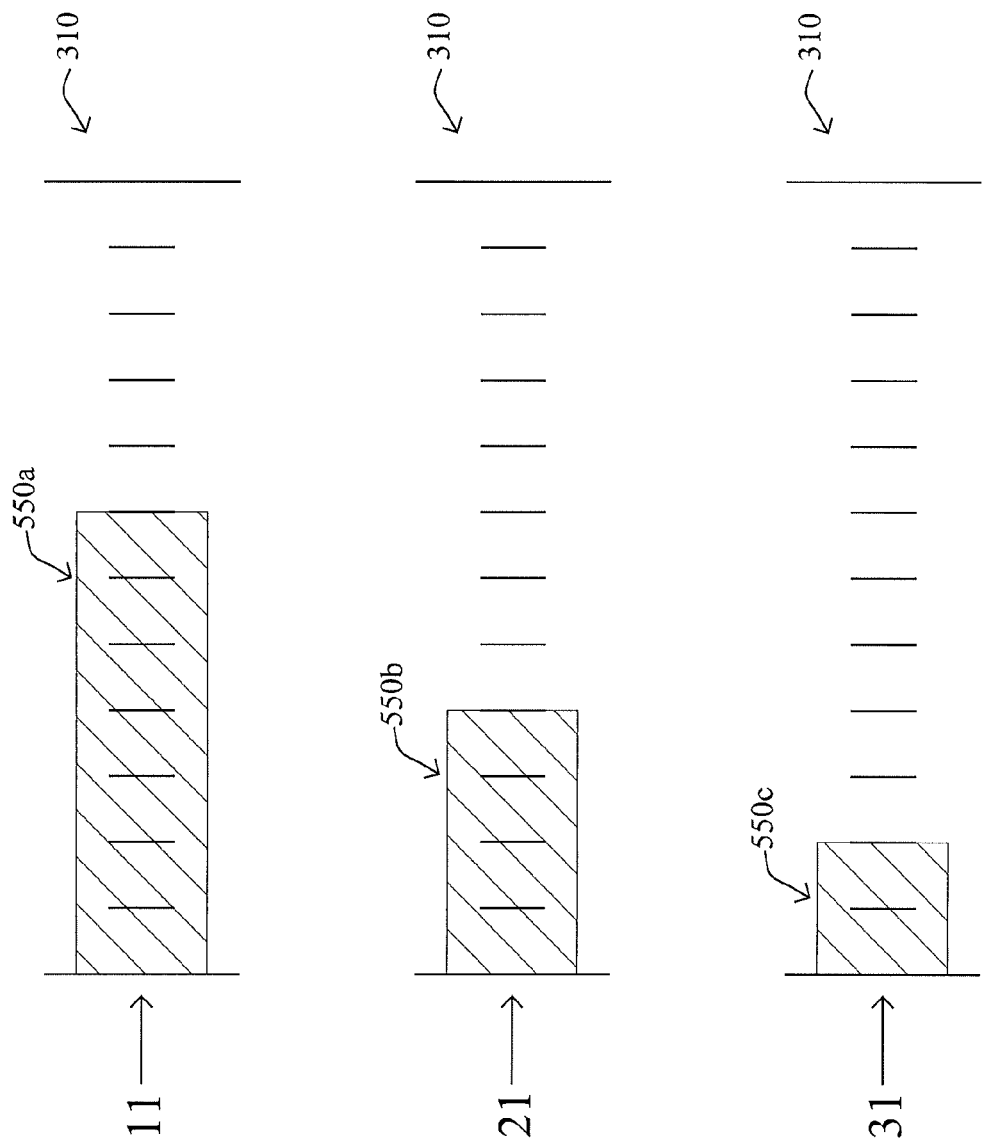
FIG. 7 illustrates an example of variable sub-slots.

FIG. 7 illustrates an example of variable/incremental sub-slots in this manner, where the length of the fast scan sub-slots 550 increase as the nodes get closer to the root (e.g., the length is inversely proportional to the distance). For example, node 31's sub-slot 550 is smaller than node 21's sub-slot 550, which in turn is smaller than node 11's sub-slot 550. Note also that if a packet is flowing in the UP direction, and as nodes are thus closer to the root, fast scan periods 550 may increase in length, though this increase in non-transmitting periods is dramatically compensated by the reduction of the number of collisions as the packets are closer to the root.

Figure 8:
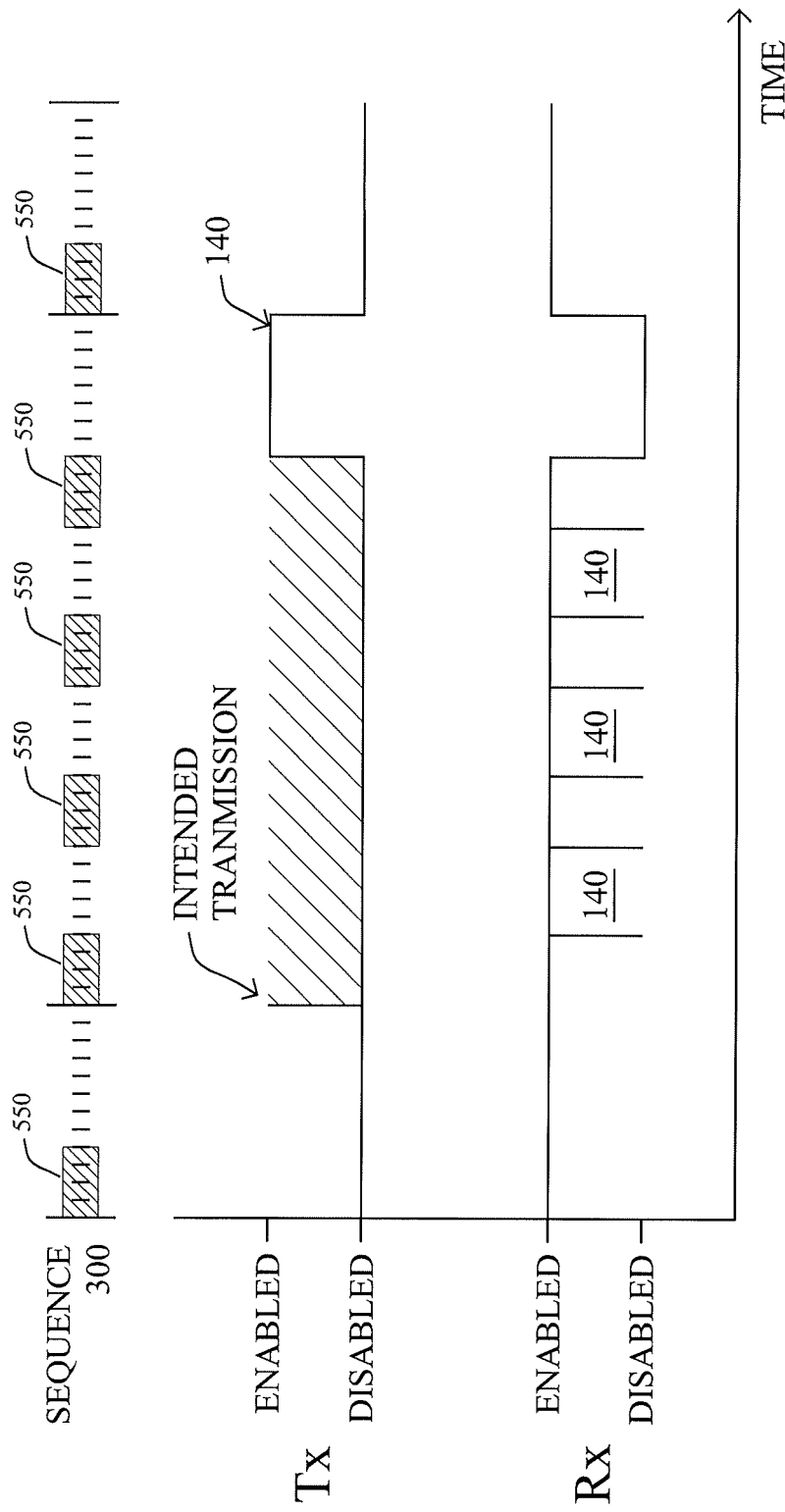
FIG. 8 illustrates another example of sub-slotting operation for chains of packets.

As shown above, the fast scan period 550 (initial portion) begins at a start of the particular timeslot 310. However, in certain embodiments herein, the period 550 may begin after completed receipt of a packet in the particular timeslot. FIG. 8 illustrates another example of sub-slotting operation in this manner, where a communication device may remain on the same particular frequency of a previous packet in order to allow the receipt of a "chain" of packets from a same transmitter. For example, assume that node 31 is trying to send a series of successively transmitted packets to node 21. As such, node 21 might be better suited to await the completion of the entire chain of packets prior to transmitting any one of the packets of the chain.

Using the technique shown in FIG. 8, therefore, node 21 ensures that node 31 has had a chance to transmit any additional packets to node 21 before node 21 transmits any of the packets (thus node 31 must also ensure that it transmits the additional packets prior to node 21 terminating its fast scan period). Note that as shown, node 21 has an "intended transmission" prior to receiving the first packet 140 of the chain, however it is also likely that the packet node 21 desires to transmit is actually the first received packet from node 31 (e.g., forwarding it to node 11). Note also that in this instance, while only a single transmitted packet 140 is shown, node 21 may correspondingly transmit (forward) the chain of packets to node 11 in a similar manner.

Returning to the example above where packet direction influences the length of the sub-slots 550, the sub-slot 550 in response to completion of packet reception may be dynamically set based on whether the packet is traveling in the UP direction (e.g., based on an 'O' bit carried in an IPv6 RPL extensions header, as may be appreciated by those skilled in the art) or DOWN direction, accordingly. Illustratively, for instance, each of the transmissions initiated by each hop along a path from leaf nodes (e.g., node 31) toward the root node may be transmitted within a receive mode of the next-hop device closer to the root node without being dropped (due to "hidden" transmissions by the intended next-hop receiver device) by transmitting the packet during the incrementally larger fast scan periods 550.

In accordance with one or more additional embodiments herein, use of the fast scan sub-slots 550 (reserved initial timeslot portions) in general by a particular device or an entire network may be triggered in response to one or more network conditions. For instance, the fast scan sub-slot 550 can be reduced to a length of zero during a time where the traffic in the network is very low. On the other hand, if the communication device (or a central network management device/server) detects a burst of traffic (e.g., due to a power outage notification or "PON"), then the mechanism may be dynamically triggered. Other triggers may exist as well, such as increased packet drop/loss rates, suspected collision rates, etc. Moreover, a length of the sub-slots 550/555 may be adjusted based on an amount of traffic in the network, as well. For example, the communication device may itself determine the amount of traffic in the network (e.g., received or detected by the device), and the length can then be adjusted by the communication device based on the determined amount of traffic. Alternatively, or in addition, the adjusted length may be received from the central network management server.

Figure 9:
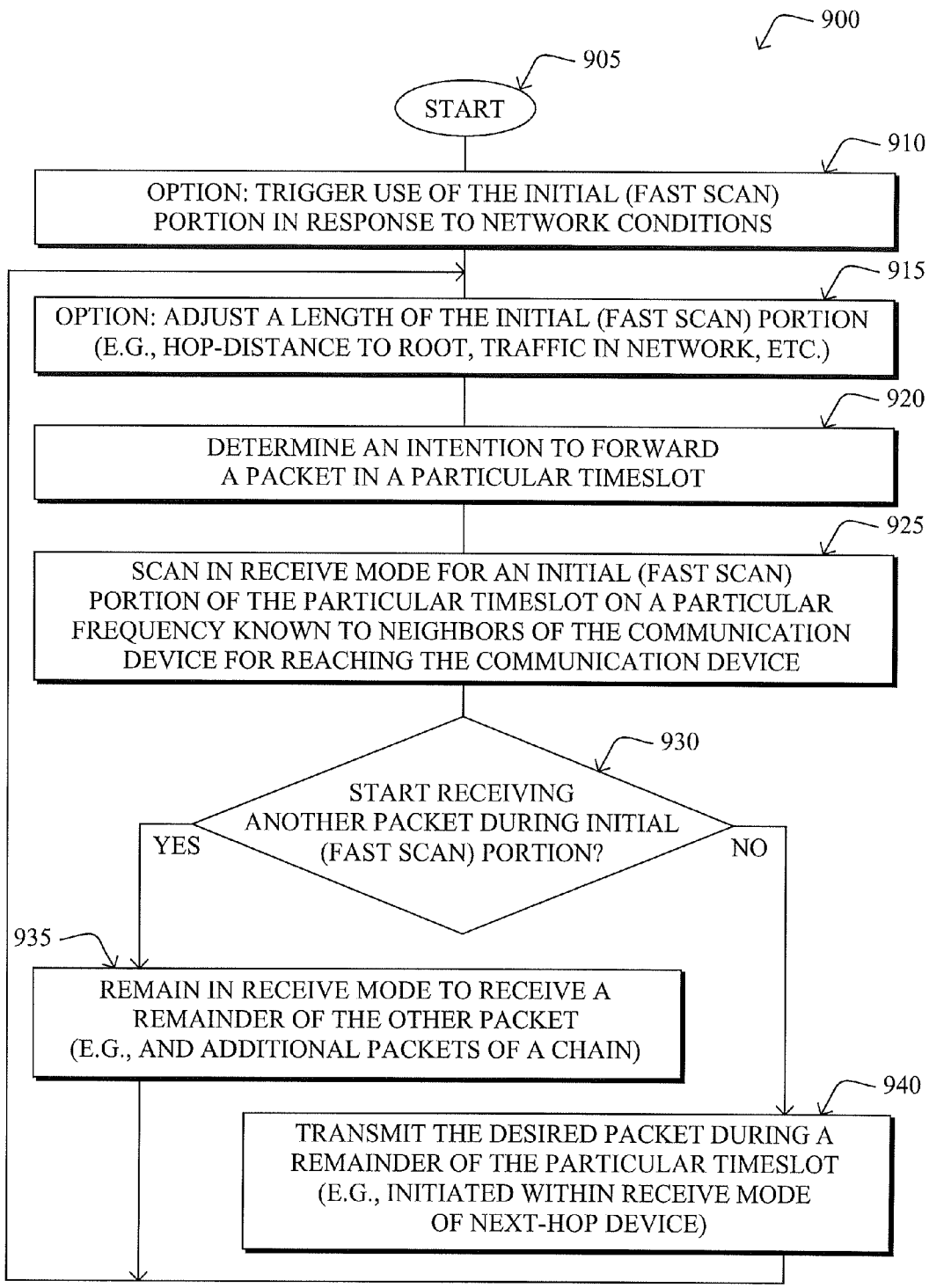
FIG. 9 illustrates an example simplified procedure for providing sub-slotting to improve packet success rate in CSMA frequency hopping networks.

FIG. 9 illustrates an example simplified procedure for providing sub-slotting to improve packet success rate in CSMA frequency hopping networks in accordance with one or more embodiments described herein. The procedure 900 starts at step 905, and continues to step 910, where optionally a trigger to use the initial (fast scan) portion 550 is detected in response to various network conditions (e.g., traffic, packet loss rate, etc.) as described above. In addition, optionally in step 915 the length of the portion 550 may be adjusted at any time, such as based on changing hop-distance to a root node, traffic changes in the network, etc.

At step 920, the particular communication device, e.g., node 21, may determine an intention to forward a packet 140 in a particular timeslot 310. In step 925, the communication device scans in receive mode for an initial (fast scan) portion 550 of the particular timeslot on a particular listening frequency known to the communication device's neighbors for reaching the communication device (i.e., prevents transmission during the fast scan sub-slot 550). If in step 930 the device starts receiving another packet during the initial (fast scan) portion, then in step 935 the device remains in the receive mode to receive a remainder of the other packet. As noted above (e.g., with reference to FIG. 8), a chain of packets may further delay the transmission of the desired packet, where the sub-slot 550 occurs immediately following reception of a previous packet.

If, on the other hand, in step 930 the device does not start receiving another packet during the initial fast scan sub-slot 550, then during the remainder of the particular timeslot 310 (i.e., active sub-slot 555), the communication device may transmit the desired packet in step 940. Note that in certain embodiments as mentioned above the transmission in step 940 may be timed to ensure that it is initiated within receive mode of the corresponding next-hop device (e.g., node 11), particularly where the traffic is flowing upstream toward the root device.

In either event (after steps 935 and 940), the procedure 900 may return to step 915 to optionally adjust the sub-slot timing, or else to wait for another packet to transmit from to the communication device in step 920 (otherwise merely listening on the pre-established hopping sequence schedule, as noted above). It should be noted that while certain steps within procedure 900 may be optional as described above, the steps shown in FIG. 9 are merely examples for illustration, and certain other steps may be included or excluded as desired. Further, while a particular order of the steps is shown, this ordering is merely illustrative, and any suitable arrangement of the steps may be utilized without departing from the scope of the embodiments herein.

The novel techniques described herein, therefore, provide for sub-slotting to improve packet success rate in CSMA frequency hopping networks. In particular, by beginning a timeslot with a dynamically adjusted fast scan listening sub-slot to determine if there is a packet to receive before transmitting and/or forwarding messages, the techniques herein reduce packet drops and/or collisions in a CSMA frequency-hopping network generally due to the intended receiver being busy transmitting, e.g., on a different channel. Note that effectively a percentage of the bandwidth may be "wasted" because of the fast scan sub-slot when a node has to transmit a packet, i.e., if no packet is being received, then an additional delay (e.g., milliseconds) is experienced by the packet for the duration of the fast scan sub-slot instead of being immediately transmitted. That being said, such an additional delay is compensated by the reduction in the number of dropped packets, retransmissions, associated backoffs, and bias in packet success rate metrics used for routing with current mechanisms.

While there have been shown and described illustrative embodiments that provide for sub-slotting to improve packet success rate in CSMA frequency hopping networks, it is to be understood that various other adaptations and modifications may be made within the spirit and scope of the embodiments herein. For example, the embodiments have been shown and described herein with relation to wireless networks. However, the embodiments in their broader sense are not as limited, and may, in fact, be used with other types of shared media networks and/or protocols using frequency hopping, such as certain PLC protocols. Also, while the description above relates to packets, the techniques may be equally applicable to non-packetized transmissions. Moreover, while the above description is specifically discussed CSMA, the use of CSMA is not meant to be tied to any particular known protocol, but instead to the general concept of carrier sensing in shared-media networks, as may be appreciated by those skilled in the art.

The foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as software being stored on a tangible (non-transitory) computer-readable medium (e.g., disks/CDs/etc.) having program instructions executing on a computer, hardware, firmware, or a combination thereof. Accordingly this description is to be taken only by way of example and not to otherwise limit the scope of the embodiments herein. Therefore, it is the object of the appended claims to cover all such variations and modifications as come within the true spirit and scope of the embodiments herein.

What is claimed is:

1. A method, comprising:
   operating a communication device according to a particular frequency hopping sequence in a communication network, the particular frequency hopping sequence having a plurality of timeslots each corresponding to a given frequency within the frequency hopping sequence;
   determining an intention to forward a first packet in a particular timeslot;
   scanning in receive mode for an initial portion of the particular timeslot on a particular frequency known to neighbors of the communication device for reaching the communication device;
   determining whether the communication device is receiving a second packet during the initial portion;
   in response to receiving the second packet during the initial portion, remaining in receive mode to receive a remainder of the second packet and transmitting the first packet once the second packet is received in a remainder of the particular timeslot; and
   in response to not receiving the second packet during the initial portion, transmitting the first packet during the remainder of the particular timeslot.

2. The method as in claim 1, further comprising:
   adjusting a length of the initial portion depending on hop-distance from the communication device to a root node of a directed acyclic graph (DAG).

3. The method as in claim 2, wherein the length is longer for devices closer to the root node than for other devices further from the root node.

4. The method as in claim 2, wherein the length is inversely proportional to the hop-distance.

5. The method as in claim 2, further comprising:
   initiating the transmitting of the first packet within a receive mode initial portion of a next-hop device closer to the root node than the communication device.

6. The method as in claim 1, wherein the initial portion begins at a start of the particular timeslot.

7. The method as in claim 1, wherein the initial portion begins after receipt of a third packet in the particular timeslot.

8. The method as in claim 7, further comprising:
   remaining on the particular frequency to receive a chain of packets from a same transmitter.

9. The method as in claim 1, further comprising:
   adjusting a length of the initial portion based on an amount of traffic in the network.

10. The method as in claim 9, wherein adjusting comprises:
    determining the amount of traffic by the communication device; and
    adjusting the length by the communication device based on the determined amount of traffic.

11. The method as in claim 1, further comprising:
    receiving an adjusted length of the initial portion from a central network management device.

12. The method as in claim 1, further comprising:
    trigger use of the initial portion in response to one or more network conditions.

13. An apparatus, comprising:
    a processor;
    a transceiver configured to communicate in a frequency hopping communication network according to a particular frequency hopping sequence, the particular frequency hopping sequence having a plurality of timeslots each corresponding to a given frequency within the frequency hopping sequence; and a memory configured to store a process executable by the processor, the process when executed by the processor operable to:
  determine an intention to forward a first packet in a particular timeslot;
  scan in receive mode for an initial portion of the particular timeslot on a particular frequency known to neighbors of the apparatus for reaching the apparatus;
  determine whether the transceiver is receiving a second packet during the initial portion;
  in response to receiving the second packet during the initial portion, remain in receive mode to receive a remainder of the second packet and transmit the first packet once the second packet is received in a remainder of the particular timeslot; and
  in response to not receiving the second packet during the initial portion, transmit the first packet during the remainder of the particular timeslot.

14. The apparatus as in claim 13, wherein the process when executed is further operable to:
  adjust a length of the initial portion depending on hop-distance from the apparatus to a root node of a directed acyclic graph (DAG).

15. The apparatus as in claim 14, wherein the process when executed is further operable to:
  initiate the transmitting of the first packet within a receive mode initial portion of a next-hop device closer to the root node than the apparatus.

16. The apparatus as in claim 13, wherein the initial portion begins at a start of the particular timeslot.

17. The apparatus as in claim 13, wherein the initial portion begins after receipt of a third packet in the particular timeslot.

18. The apparatus as in claim 13, wherein the process when executed is further operable to:
  adjust a length of the initial portion based on an amount of traffic in the network.

19. The apparatus as in claim 13, wherein the process when executed is further operable to:
  trigger use of the initial portion in response to one or more network conditions.

20. A tangible, non-transitory, computer-readable media having software encoded thereon, the software, when executed by a processor on a communication device operating in a frequency hopping communication network according to a particular frequency hopping sequence, the particular frequency hopping sequence having a plurality of timeslots each corresponding to a given frequency within the frequency hopping sequence, operable to:
  determine an intention to forward a first packet in a particular timeslot;
  scan in receive mode for an initial portion of the particular timeslot on a particular frequency known to neighbors of the communication device for reaching the communication device;
  determine whether the communication device is receiving a second packet during the initial portion;
  in response to receiving the second packet during the initial portion, remain in receive mode to receive a remainder of the second packet and transmit the first packet once the second packet is received in a remainder of the particular timeslot; and
  in response to not receiving the second packet during the initial portion, transmit the first packet during the remainder of the particular timeslot.

* * * * *

UNITED STATES PATENT AND TRADEMARK OFFICE
CERTIFICATE OF CORRECTION

PATENT NO. : 9,072,100 B2
APPLICATION NO. : 13/187075
DATED : June 30, 2015
INVENTOR(S) : Vasseur et al.

Page 1 of 1

It is certified that error appears in the above-identified patent and that said Letters Patent is hereby corrected as shown below:

In the Specification

In column 1, line 21, please amend as follows:
specifies what channel to communicate on at what time.

In column 7, line 66, please amend as follows:
portion, the device remains in receive mode to receive a

In column 11, line 6, please amend as follows:
or else to wait for another packet to transmit from the

Signed and Sealed this
Seventeenth Day of November, 2015

Michelle K. Lee
*Director of the United States Patent and Trademark Office*